(12) United States Patent
He

(10) Patent No.: US 10,300,956 B2
(45) Date of Patent: May 28, 2019

(54) FRAME FOR AUTOMOBILE WINDSHIELD AND SIDE WINDOWS WITH IMPROVED VISIBILITY

(71) Applicant: Yizong He, Forest Lake, MN (US)

(72) Inventor: Yizong He, Forest Lake, MN (US)

( * ) Notice: Subject to any disclaimer, the term of this patent is extended or adjusted under 35 U.S.C. 154(b) by 0 days.

(21) Appl. No.: 15/914,906

(22) Filed: Mar. 7, 2018

(65) Prior Publication Data

US 2018/0273105 A1 Sep. 27, 2018

(30) Foreign Application Priority Data

Mar. 25, 2017 (CN) .................... 2017 2 0298025 U

(51) Int. Cl.
*B62D 25/04* (2006.01)
*B62D 29/04* (2006.01)
*G02B 5/04* (2006.01)

(52) U.S. Cl.
CPC ........... *B62D 25/04* (2013.01); *B62D 29/043* (2013.01); *G02B 5/045* (2013.01)

(58) Field of Classification Search
CPC ... G02B 5/04; G02B 5/06; G02B 5/12; G02B 5/045; G02B 5/0231; G02B 5/1814; G02B 7/00; G02B 7/18; G02B 7/24; G02B 7/181; G02B 7/1805; B62D 25/04; B62D 29/043
See application file for complete search history.

(56) References Cited

U.S. PATENT DOCUMENTS

| | | | | |
|---|---|---|---|---|
| 5,751,482 A | * | 5/1998 | Challener, IV | .......... G02B 5/04 359/485.03 |
| 2005/0099815 A1 | * | 5/2005 | Kim | ..................... G02B 6/0038 362/339 |
| 2009/0323192 A1 | * | 12/2009 | Towndrow | ......... G02B 27/1013 359/634 |
| 2015/0248013 A1 | | 9/2015 | Chen et al. | |

(Continued)

FOREIGN PATENT DOCUMENTS

CN 103912186 A 7/2014

OTHER PUBLICATIONS

"Invisibility", Wikipedia, https://en.wikipedia.org/wiki/Invisibility, 3 pages, printed from the Internet on May 16, 2018.

(Continued)

*Primary Examiner* — Sultan Chowdhury
(74) *Attorney, Agent, or Firm* — Chen Yoshimura LLP

(57) ABSTRACT

A frame for an automobile windshield and side windows with improved visibility is formed by a plurality of hollow quadrangular prisms. Each hollow quadrangular prism includes four rigid right triangular prisms laid symmetrically in a V-like shape, two on each side of the V. Each rigid right triangular prism has a base triangle which is an obtuse and scalene triangle, and front and rear lateral faces which are covered with a reflective material of visible light. The front and rear lateral faces of the four right triangular prisms face each other forming a channel between them, which is filled with a transparent material. The hollow quadrangular prism reflects incident light in sequence by the reflective lateral faces of right triangular prisms. Many hollow invisible quadrangular prisms are stacked up to form a pillar for an automobile.

6 Claims, 3 Drawing Sheets

501: incident ray parallel to ipsilateral bottom floor of left;
502: incident ray parallel to ipsilateral bottom floor of right;
503 incident ray going through the channel of a hollow quadrangular prism; 504, 505, 506, and 507 are invisible areas

(56) References Cited

U.S. PATENT DOCUMENTS

2017/0010451 A1 1/2017 Naya
2018/0164079 A1 6/2018 Banerjee et al.

OTHER PUBLICATIONS

"How to make an invisibility Cloaking device using mirrors", Devon Cummings, Addictootech, Aug. 18, 2013, http://www.addictootech.com/invisibility-cloaking-device/, 5 pages, printed from the Internet on May 16, 2018.

* cited by examiner

101: a car;  102: A-pillar;  103: B-pillar;
104: C-pillar; 105: D-pillar; 106: the roof of a car.

Terminologies of a right triangular prism
201 upper base triangle;   202 lower base triangle;
203 front lateral face;    204 rear lateral face;
205 bottom floor;          206, 207, 208 lateral edge;
Altitude of a triangular prism equals to length of lateral edge 206, 207, 208.

301 and 302: identical triangular prisms of solid rigid named upper pair;
303 and 304: identical triangular prisms of solid rigid named lower pair;
305 306 309 310: rear lateral faces;
307 308 311 312: front lateral faces.

501: incident ray parallel to ipsilateral bottom floor of left;
502: incident ray parallel to ipsilateral bottom floor of right;
503 incident ray going through the channel of a hollow quadrangular prism; 504, 505, 506, and 507 are invisible areas 601: observer's eye; 602: A-pillar of an automobile;
603, 604, 605, 606: hollow quadrangular prisms of invisibility.

FRAME FOR AUTOMOBILE WINDSHIELD AND SIDE WINDOWS WITH IMPROVED VISIBILITY

BACKGROUND OF THE INVENTION

Field of the Invention

This invention relates to camouflaging various pillars framing the windshield and side windows of an automobile.

Description of Related Art

Made of transparent fragile glass, the windshield and side windows of automobiles cannot offer as much protection to both driver and passengers as steel materials. Nevertheless, the transparent material is necessary so that drivers can see their surroundings clearly. Almost all automobiles need frames supporting the windshield and side windows. All conventional pillars framing the windshield and side windows are solid chunky posts. Consequently, drivers need to adjust their position to look around such pillars in order to see what is in front of the automobile. As shown in FIG. 1, there is no doubt that A, B, C and D pillars, labeled 102, 103, 104 and 105, according to conventional automobile design occupy a considerable area, inevitably blocking the view of drivers and causing blind spots.

Jaguar Land Rover removed blind spots caused by chunky structural pillars and used head-up display projectors to beam a picture of the roadscape onto windscreen pillars to make up for any obscured views, turning all the pillars into video screens, including the B- and C-pillars in the back. Each one takes a live video stream from a series of cameras, beaming up footage of vehicles, pedestrians and other objects outside the car for a 360-degree panorama view. Other similar technologies to make the A-pillars invisible are also reported. These designs do not influence the structure of the pillars and thus the mechanical strength can be maintained. However, the frame still remains partly visible and the color of the projected images is not completely natural.

As early as 2001, the Volvo car company proposed the Safety Concept Car (SCC) and hollowed out the A-pillar. Obviously such a lattice-like pillar enlarges the view of the driver considerably and makes the car safer to drive. Similar technologies were also developed by other designers.

Different from all above, another design made the pillar triangular and shrunk the size of A-pillars, using steel of super strength. This elegant and solid pillar can reduce the area of the blind spot effectively.

Audi AR boldly and originally removed the A-pillar completely, supporting the windshield only by the roof. The visual field increases perfectly and driving becomes much safer because the blind spots caused by the two A-pillars disappear without a trace. Nevertheless, some question the security of the car, doubting that in an accident or roll-over, the roof can hold without the A and B pillars.

SUMMARY

Accordingly, the present invention is directed to a frame for an automobile windshield and side windows with improved visibility that substantially obviates one or more of the problems due to limitations and disadvantages of the related art.

Embodiments of the present invention provide a prism group, referred to as a "hollow quadrangular prism of invisibility" or "hollow quadrangular prism" in this disclosure, which is formed by four rigid right triangular prisms of a solid material, laid symmetrically in a V-like shape serving as support for the windshield and side windows used in automobiles. The prominent advantage of the support structure is that the pillar appears to be almost invisible so that the blind spots caused by A, B, C and D pillars will be diminished to a large extent. Therefore, the driver's view is considerably enlarged.

The pillar structure reflects incident light, in sequence by the lateral faces of mirrors of right triangular prisms. Many hollow invisible quadrangular prisms are stacked up to form a pillar for an automobile replacing the traditional one.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a hollow quadrangular prism, which includes:

first, second, third and fourth rigid right triangular prisms, each right triangular prism having an upper and a lower base having identical shapes of an obtuse and scalene triangle, each right triangular prism having a rectangular front lateral face, a rectangular rear lateral face and a rectangular bottom floor, located between and perpendicular to the upper and lower bases, the obtuse triangles of the upper and lower bases flare to the bottom floor, wherein the rectangular front lateral face and the rectangular rear lateral face of each right triangular prism is covered by a reflective material of visible light, wherein the upper bases of the first to fourth right triangular prisms are on a same first plane and the lower bases of the four right triangular prisms are on a same second plane, wherein the bottom floors of the first and third right triangular prisms are on a same third plane and immediately adjacent each other, and the front lateral face of the first right triangular prism and the rear lateral face of the third right triangular prism are adjacent each other, wherein the bottom floors of the second and fourth right triangular prisms are on a same fourth plane and immediately adjacent each other, and the front lateral face of the second right triangular prism and the rear lateral face of the fourth right triangular prism are adjacent each other, wherein the third plane and the fourth plane are non-parallel to each other and define a bisector plane between them, wherein the first to fourth right triangular prisms are located between the third and fourth planes, wherein the first and second right triangular prisms are symmetrical with respect to the bisector, and the third and fourth right triangular prisms are symmetrical with respect to the bisector, and wherein a height of the upper base triangle of the first right triangular prism, defined by a perpendicular distance from the bottom floor of the first right triangular prism to an intersection line of the front and rear lateral faces of the first right triangular prism, is identical to a height of the upper base triangle of the third right triangular prism, defined by a perpendicular distance from the bottom floor of the third right triangular prism to an intersection line of the front and rear lateral faces of the third right triangular prism.

Parameters of the of the first to fourth triangular prisms defined in the first plane satisfy a set of equations described in more detail later.

Preferably, a space between the first, second, third and fourth right triangular prisms is filled with a transparent material. In some embodiments, the transparent material is a solid transparent material. Preferably, each of the first to fourth right triangular prisms has a solid interior.

In another aspect, the present invention provides a support pillar, which includes a plurality of the above hollow quadrangular prisms stacked up.

It is to be understood that both the foregoing general description and the following detailed description are exemplary and explanatory and are intended to provide further explanation of the invention as claimed.

DETAILED DESCRIPTION OF PREFERRED EMBODIMENTS

A hollow quadrangular prism designed to serve as an almost invisible frame for an automobile employs four right triangular prisms of solid, rigid material laid symmetrically in a V-like shape with respect to their bisector (the bisector being the plane that bisect the angle of the V). It is configured to make a good portion of the frame invisible to the driver of an automobile and renders the driving safer and more comfortable.

Such a pillar can camouflage itself, without depending on any outer refractive materials or reflectors. More precisely, it is an invisible hollow quadrangular prism comprised of four right triangular prisms with mirror lateral faces. Such quadrangular prisms line up to form a pillar replacing the traditional solid chunky pillars that support the windshield and side windows, so that the area of the blind spot will be reduced to some extent and provide the driver with a better view.

Figure 1:
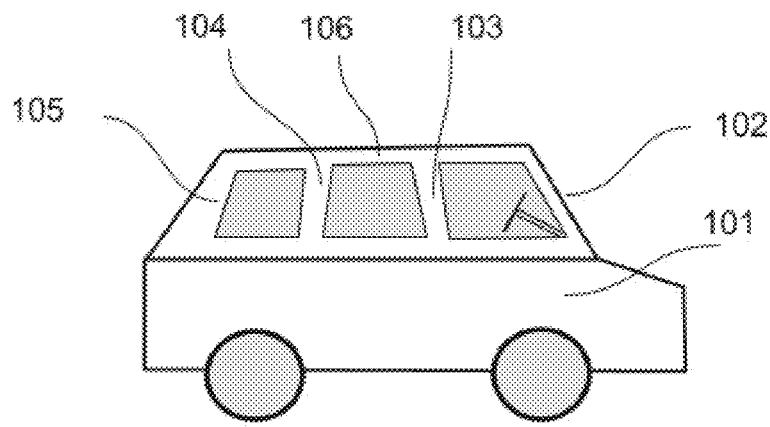
FIG. 1 illustrates pillars A, B, C and D of an automobile.

FIG. 1 illustrates the definition of A, B, C and D-pillar of an automobile as well as the roof supported by all the pillars.

It is well known that when visible light, emitted or reflected by a given object, enters a human's eyes, the object is seen. Based on this fact, in order to make some object invisible, it is necessary to bend the light from the object to avoid entering the observer's eyes. A common way to curl light is through the use of refractive materials or reflection mirrors. Therefore, the core problem of stealth is how to bend light efficiently.

A quadrangular prism of invisibility introduced herein bends two beams of parallel incident rays by eight lateral faces of mirrors laid on four triangular prisms.

Figure 2:
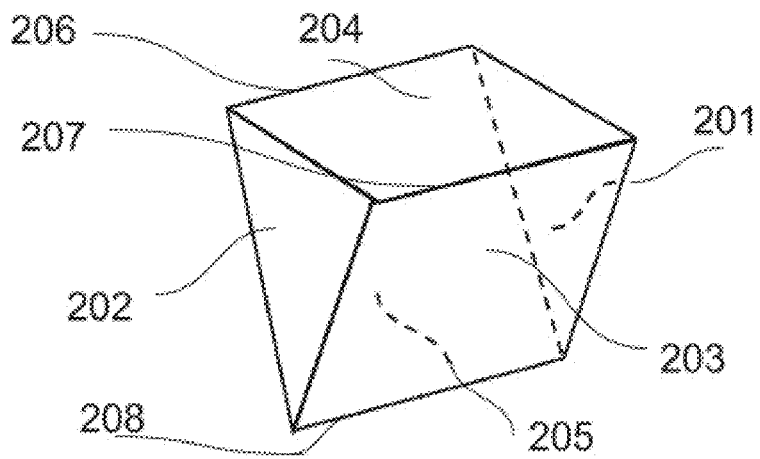
FIG. 2 illustrates the definition of a right triangular prism with terminologies for descripting other figures concerned.

In order to make the description easier to understand, first of all, some relevant terminologies for a right triangular prism, the component used to construct a hollow quadrangular prism of invisibility, are introduced below. FIG. 2 illustrates the definition of a right triangular prism. A triangular prism is defined as a three-sided prism; it is a polyhedron made of a triangular lower base face, a translated copy as the upper base face, and three faces joining corresponding sides. A right triangular prism has rectangular sides. All cross-sections parallel to the base faces are the same triangle. Some terminologies of a right triangular prism are defined as following, with reference to FIG. 2: define 201 as the upper base triangle, which is obtuse and scalene; define 202 as the lower base triangle, which is obtuse and scalene and identical to the upper base triangle; define 203 as the front lateral face, covered by a reflective material of visible light; define 204 as the rear lateral face, covered by a reflective material of visible light; define 205 as the bottom floor of a rectangle; and define 206, 207 and 208 as the altitudes of the triangular prism, which are three parallel lateral edges being the same length.

The definition of a quadrangular prism is a polyhedron with two congruent and parallel faces (the bases) and whose lateral faces are parallelograms. The hollow quadrangular prism of invisibility is comprised of four right triangular prisms arranged as shown in FIG. 3.

Figure 3:
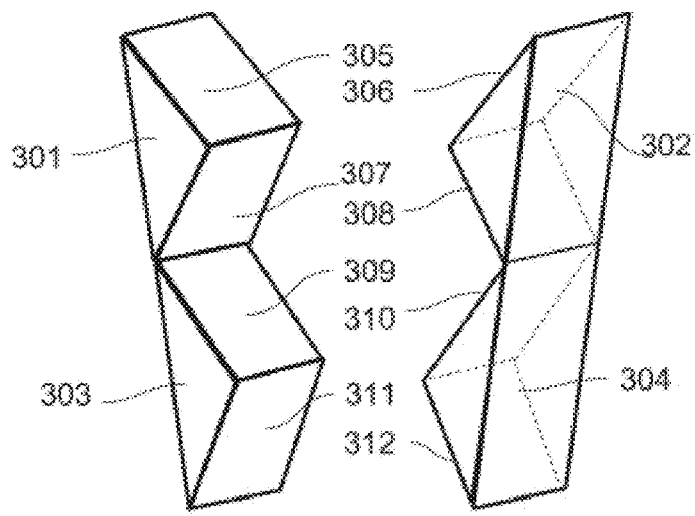
FIG. 3 illustrates the structure of the hollow quadrangular prism of invisibility serving as a new windshield frame for an automobile.

Again in FIG. 3, all altitudes for the four right triangular prisms of rigid solid are the same length; consequently, all the widths of the four bottom floors of the rectangles are identical. Two bottom floors of triangular prisms on the same side are on the same plane with adjacent lateral edge precisely overlapped.

The upper base triangles of the four prisms are on the same plane and the lower base triangles of the four prisms are on another same plane.

Again in FIG. 3, all eight scalene base triangles, with identical height, are obtuse angles flaring towards the corresponding bottom floor. The heights of the upper and lower base triangles of the four right triangular prisms, as defined by the perpendicular distance from the bottom floor to the lateral edge opposite the bottom floor of each prism, are all identical and denoted h (see FIG. 4). Thus, as shown in FIG. 4, the straight line connecting points C and G is parallel to the bottom floors AE and EI.

Again in FIG. 3, the four triangular prisms are divided into two pairs which are placed conjointly, the upper pair being prisms 301 and 302, connecting to the lower pair 303 and 304 immediately below. Also, the two prisms in each pair are symmetrical with respect to the bisector of the V-shape. The two right triangular prisms on the same side (301 and 303) are laid in alignment so that their two bottom floors are on the same plane with the adjacent lateral edges overlapping precisely, and so are the 302 and 304 members on the other side. The bottom point of the "V" (i.e. the intersection of the line connecting points C and G and the line connecting points D and H) is approximately the observer's view point, denoted "O".

The law of reflection states that for a reflective surface patch, the incident ray, the reflected ray, and the normal all lie in the same plane. Furthermore, the angle of reflection equals to the angle of incidence.

Figure 4:
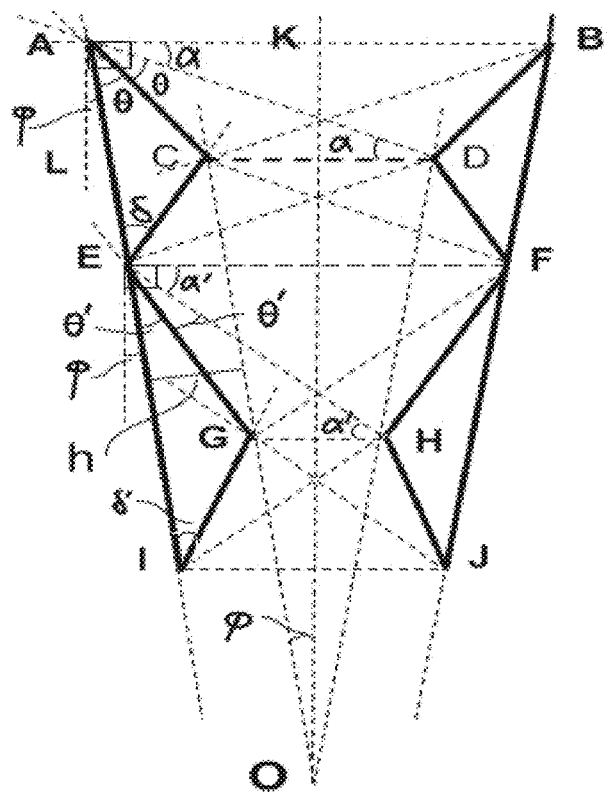
FIG. 4 illustrates a cross sectional view of the structure of FIG. 3 and the parameters determining the structure of the invisible hollow quadrangular prism shown in FIG. 3.

FIG. 4 represents a cross-section parallel to all base triangles of the four triangular prisms shown in FIG. 3. In FIG. 4, points A, C and E are vertices of the triangle of prism 301 in FIG. 3, points B, D and F are vertices of the triangle of prism 302, points E, G and I are vertices of the triangle of prism 303, and points F, H and J are vertices of the triangle of prism 304. All obtuse base triangles flare to the corresponding bottom floors. Two pairs of corresponding acute angles, on the same side of the triangular prism, are named by θ, δ, θ', δ' from upper to lower in order; the acute angle named by a is spanned by the straight line AD and the straight line AB which is perpendicular to the bisector of the V-like shape. Similarly, the angle named by α' is spanned by the straight line EH and the straight line EF which is perpendicular to the bisector of the V-like shape. The flare angle formed by two oblique lines of V (lines CG and DH) is represented by 2φ. The parameters defined as above should strictly obey the six equations below:

$$\delta+\theta+\alpha=\pi/2 \quad \text{Eq. (1)}$$

$$\phi+2\theta+\alpha=\pi/2 \quad \text{Eq. (2)}$$

$$\delta'+\theta'+\alpha'=\pi/2 \quad \text{Eq. (3)}$$

$$\phi+2\theta'+\alpha'=\pi/2 \quad \text{Eq. (4)}$$

$$2h\csc\delta\,\cos(\delta+\alpha)+h\csc\alpha=EF \quad \text{Eq. (5)}$$

$$2h\csc\theta'\,\cos(\theta'+\alpha')+h\csc\alpha'=EF \quad \text{Eq. (6)}$$

where EF is the perpendicular distance between the two overlapped lateral edges of two pairs of triangular prisms.

Figure 5:
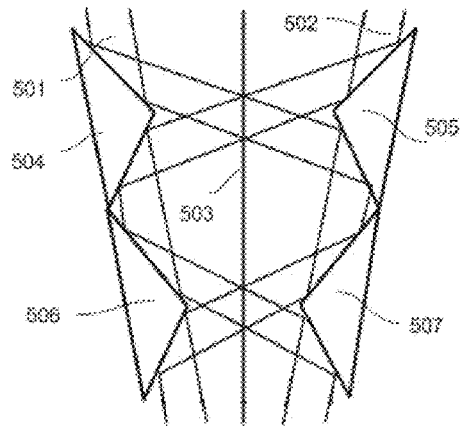
FIG. 5 illustrates the light paths going through the hollow quadrangular prism to produce the camouflaged effect.

FIG. 5 shows the four prisms as in FIG. 3 and illustrates the light paths demonstrating the principle of stealth technology. The incident light 501, parallel to the bottom floors of both prism 301 (cross section line AE in FIG. 4) and prism 303 (cross section line EI in FIG. 4), is reflected, each in due succession by the plane mirrors 305, 308, 310 and 311 in FIG. 3. Because of the above-described parameter relationships, the reflected light from the plane mirror 305 is parallel to the line AD shown in FIG. 4, the reflected light from the plane mirror 308 is parallel to the line DH, the reflected light from the plane mirror 310 is parallel to the line HI, and the reflected light from the plane mirror 311 is parallel to the line EI which is the direction of the original incident light 501. Finally, light exits from the triangular prism system parallel and overlapping in the direction of the incident ray 501.

Similarly, the incident light 502, parallel to bottom floors both prism 302 (cross section line BF in FIG. 4) and prism 304 (cross section line FJ in FIG. 4), is reflected, each in due succession by the plane mirrors 306, 307, 309 and 312 in FIG. 3. Finally, light exits from the triangular prism system in the direction of the initial incident ray 502 in a parallel and overlapping way. The incident light 503 moving through the channel of the hollow quadrangular prism (i.e., the space between the two prisms 301 and 303 on one side and the two prisms 302 and 304 on the other side) goes out in rectilinear propagation without any blockage. The total effect is that all the four triangular prisms are camouflaged from the observer's point O shown in FIG. 4. Therefore, the areas 504, 505, 506 and 507 inside the prisms are camouflaged areas.

The channel of the hollow quadrangular prism is filled fully with a transparent material, such as air or a solid or liquid transparent material, in the area formed between the four solid right triangular prisms. It should be noted that in the phrases "hollow quadrangular prism of invisibility" and "hollow quadrangular prism" used throughout this disclosure, the word "hollow" refers to this transparent channel, not the individual prisms 301-304. The interiors of the individual prisms 301-304 are preferably made of a solid, strong material such as metal for structural support for the windshields and windows. Preferably, the channel is also filled with a solid transparent material such as a transparent plastic to enhance structural support.

Figure 6:
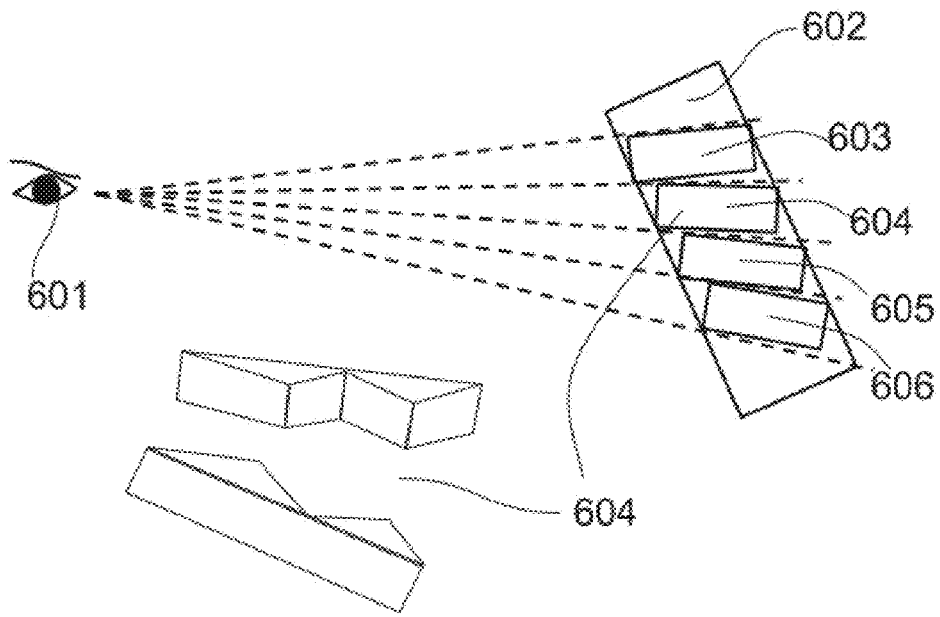
FIG. 6 illustrates an example of multiple hollow quadrangular prisms aligned and stacked to form a pillar.

FIG. 6 illustrates the way that the hollow quadrangular prisms of invisibility, 603, 604, 605 and 606, are aligned and stacked up to form a pillar 602 of an automobile. The sight lines from the observer's point 601 flare toward pillar 602 and each invisible quadrangular prism lines up with the lateral edges parallel to the respective sight lines. The multiple hollow quadrangular prisms 603, 604, 605 and 606 may be the same or different, but each of them has parameters that satisfy the conditions described above. The channel space within the quadrangular prism is filled by transparent materials. Some of gaps formed by adjacent quadrangular prisms are welded by steel to maintain the mechanical strength.

In addition to a frame for an automobile, the hollow quadrangular prism described above may be used in other applications to construct an almost invisible structure.

Further, although the hollow quadrangular prism described above is formed of four or two pairs of prisms, it may also be formed of four, six, etc. pairs prisms arranged in the V shape.

It will be apparent to those skilled in the art that various modification and variations can be made in the pillar and window frame for automobiles of the present invention without departing from the spirit or scope of the invention. Thus, it is intended that the present invention cover modifications and variations that come within the scope of the appended claims and their equivalents.

What is claimed is:

1. A hollow quadrangular prism, comprising:
   first, second, third and fourth rigid right triangular prisms,
   each right triangular prism having an upper and a lower base having identical shapes of an obtuse and scalene triangle,
   each right triangular prism having a rectangular front lateral face, a rectangular rear lateral face and a rectangular bottom floor, located between and perpendicular to the upper and lower bases, the obtuse triangles of the upper and lower bases flare to the bottom floor,
   wherein the rectangular front lateral face and the rectangular rear lateral face of each right triangular prism is covered by a reflective material of visible light,
   wherein the upper bases of the first to fourth right triangular prisms are on a same first plane and the lower bases of the four right triangular prisms are on a same second plane,
   wherein the bottom floors of the first and third right triangular prisms are on a same third plane and immediately adjacent each other, and the front lateral face of the first right triangular prism and the rear lateral face of the third right triangular prism are adjacent each other, wherein the bottom floors of the second and fourth right triangular prisms are on a same fourth plane and immediately adjacent each other, and the front lateral face of the second right triangular prism and the rear lateral face of the fourth right triangular prism are adjacent each other,
   wherein the third plane and the fourth plane are non-parallel to each other and define a bisector plane between them, wherein the first to fourth right triangular prisms are located between the third and fourth planes, wherein the first and second right triangular prisms are symmetrical with respect to the bisector, and the third and fourth right triangular prisms are symmetrical with respect to the bisector, and
   wherein a height of the upper base triangle of the first right triangular prism, defined by a perpendicular distance from the bottom floor of the first right triangular prism to an intersection line of the front and rear lateral faces of the first right triangular prism, is identical to a height of the upper base triangle of the third right triangular prism, defined by a perpendicular distance from the bottom floor of the third right triangular prism to an intersection line of the front and rear lateral faces of the third right triangular prism.

2. The hollow quadrangular prism of claim 1, wherein parameters of the of the first to fourth triangular prisms defined in the first plane satisfy:

$$\delta+\theta+\alpha=\pi/2 \quad \text{Eq. (1)}$$

$$\phi+2\theta+\alpha=\pi/2 \quad \text{Eq. (2)}$$

$$\delta'+\theta'+\alpha'=\pi/2 \quad \text{Eq. (3)}$$

$$\phi+2\theta'+\alpha'=\pi/2 \quad \text{Eq. (4)}$$

$$2h\csc\delta\,\cos(\delta+\alpha)+h\csc\alpha=EF \quad \text{Eq. (5)}$$

$$2h\csc\theta'\,\cos(\theta'+\alpha')+h\csc\alpha'=EF \quad \text{Eq. (6)}$$

where θ is an acute angle of the upper base triangle of the first right triangular prism between its rear lateral face and bottom floor, δ is an acute angle of the upper base triangle of the first right triangular prism between its front lateral face and bottom floor, θ' is an acute angle of the upper base triangle of the third right triangular prism between its rear lateral face and bottom floor, δ' is an acute angle of the upper base triangle of the third right triangular prism between its front lateral face and bottom floor, α is an acute angle spanned by a straight line perpendicular to the bisector and a straight line formed by a vertex of the upper base triangle of the first right triangular prism opposite its front lateral face and a vertex of the upper base triangle of the second right triangular prism opposite its bottom floor, α' is an acute angle spanned by another straight line perpendicular to the bisector and a straight line formed by a vertex of the upper base triangle of the third right triangular prism opposite its front lateral face and a vertex of the upper base triangle of the fourth right triangular prism opposite its bottom floor, φ is one half of an angle forming by the third and fourth planes, h is the identical height of the upper base triangles of the first and third right triangular prisms, and EF is a perpendicular distance between a point E which is a vertex of the upper base triangle of the first right triangular prism opposite its rear lateral face and also the vertex of the upper base triangle of the third right triangular prism opposite its front lateral face, and a point F which is a vertex of the upper base triangle of the second right triangular prism opposite its rear lateral face and also the vertex of the upper base triangle of the fourth right triangular prism opposite its front lateral face.

3. The hollow quadrangular prism of claim 1, wherein a space between the first, second, third and fourth right triangular prisms is filled with a transparent material.

4. The hollow quadrangular prism of claim 3, wherein the transparent material is a transparent plastic.

5. The hollow quadrangular prism of claim 1, wherein each of the first to fourth right triangular prisms has a solid interior.

6. A support pillar, comprising a plurality of the hollow quadrangular prism of claim 5 stacked up.

* * * * *